(12) United States Patent
Lee (10) Patent No.: US 9,738,244 B2
(45) Date of Patent: Aug. 22, 2017

(54) AIRBAG APPARATUS

(71) Applicant: Hyundai Mobis Co., Ltd., Seoul (KR)

(72) Inventor: Hyo Bae Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/753,714

(22) Filed: Jun. 29, 2015

(65) Prior Publication Data

US 2016/0096503 A1 Apr. 7, 2016

(30) Foreign Application Priority Data

Oct. 2, 2014 (KR) .................. 10-2014-0132990

(51) Int. Cl.
*B60R 21/2338* (2011.01)
*B60R 21/233* (2006.01)
*B60R 21/231* (2011.01)

(52) U.S. Cl.
CPC ........ *B60R 21/2338* (2013.01); *B60R 21/231* (2013.01); *B60R 21/233* (2013.01); *B60R 2021/23115* (2013.01); *B60R 2021/23308* (2013.01); *B60R 2021/23324* (2013.01); *B60R 2021/23382* (2013.01)

(58) Field of Classification Search
CPC . B60R 21/2338; B60R 21/231; B60R 21/233; B60R 2021/23382; B60R 2021/23107; B60R 2021/23115; B60R 2021/23308; B60R 2021/23324; B60R 2021/23332
USPC .................. 280/743.2, 743.1, 729
See application file for complete search history.

(56) References Cited

U.S. PATENT DOCUMENTS

| | | | | |
|---|---|---|---|---|
| 7,631,891 | B2 * | 12/2009 | Washino | ............... B60R 21/203 280/731 |
| 2006/0197320 | A1 * | 9/2006 | Abe | ..................... B60R 21/233 280/729 |
| 2007/0262570 | A1 | 11/2007 | Choi | |

FOREIGN PATENT DOCUMENTS

| | | |
|---|---|---|
| JP | 3932867 | 6/2007 |
| JP | 2008-049858 | 3/2008 |
| JP | 2010-163087 | 7/2010 |
| JP | 2012006443 | 1/2012 |
| KR | 10-2010-0132731 | 12/2010 |

* cited by examiner

*Primary Examiner* — Keith J Frisby
(74) *Attorney, Agent, or Firm* — H.C. Park & Associates, PLC (57) ABSTRACT

An airbag apparatus in which an airbag is deployed while maintaining appropriate deployment pressure. A tether is tightened by deployment force of a sub-cushion, and pulls a hidden cushion disposed in a main cushion so that the hidden cushion is deployed, such that a volume in the main cushion is reduced by the hidden cushion, thereby maintaining deployment pressure of the main cushion.

12 Claims, 6 Drawing Sheets

AIRBAG APPARATUS

CROSS-REFERENCE TO RELATED APPLICATION

The application claims priority from and the benefit of Korean Patent Application No. 10-2014-0132990, filed on Oct. 2, 2014, which is hereby incorporated by reference for all purposes as if fully set forth herein.

BACKGROUND

Field

Exemplary embodiments relate to an airbag apparatus, and more particularly, to a passenger airbag apparatus.

Discussion of the Background

In general, an airbag is installed in a vehicle in order to protect an occupant seated in a driver seat or a front passenger seat at the time of a vehicle accident using cushioning force.

The airbag is designed to be deployed by pressure enough to protect an adult person having an average weight (for example, 65 kg).

Meanwhile, while only adult persons having an average weight are seated in the driver seat, various occupants, such as children, kids, and adult persons having a weight less than the average weight as well as adult persons having an average weight are seated in the front passenger seat.

Therefore, in the case of the airbag for a front passenger seat, it is necessary to vary deployment pressure in accordance with the type of occupant. In order to vary deployment pressure in accordance with the type of occupant, a method of adjusting an amount of gas discharged from the airbag and a method of installing a sub-cushion having a separate chamber in the airbag are used for the passenger airbag.

However, in the case of the method of installing the sub-cushion in the airbag, the sub-cushion is inflated by gas in the airbag, and as a result, there is a problem in that deployment pressure of the airbag becomes less than an appropriate pressure capable of protecting the passenger.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an airbag apparatus in which an airbag is deployed while maintaining appropriate deployment pressure.

Additional aspects will be set forth in the detailed description which follows, and, in part, will be apparent from the disclosure, or may be learned by practice of the inventive concept.

An exemplary embodiment of the present invention discloses an airbag apparatus including: a main cushion configured to be inflated when gas flows into the main cushion, and deployed forward toward a passenger; a sub-cushion coupled to the main cushion, disposed in the main cushion, and configured to be deployed to the outside of the main cushion by gas in the main cushion; a hidden cushion coupled to the main cushion, and disposed in the main cushion; and a tether coupled to the sub-cushion and the hidden cushion, and configured to pull the hidden cushion by using a deployment force of the sub-cushion so that the hidden cushion is deployed.

An exemplary embodiment of the present invention also discloses an airbag apparatus including: a main cushion having at least one sub-cushion configured to protrude when gas flows thereinto; and a hidden cushion coupled to the main cushion. The hidden cushion is pulled into the main cushion and reduces a volume in the main cushion when the sub-cushion protrudes.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of films, panels, regions, etc., may be exaggerated for clarity and descriptive purposes. Also, like reference numerals denote like elements.

When an element or layer is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
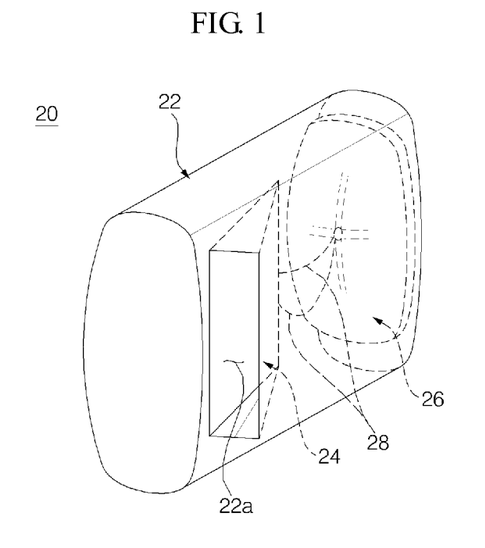
FIG. 1 is a perspective view illustrating an airbag apparatus according to an exemplary embodiment of the present invention.
Figure 2:
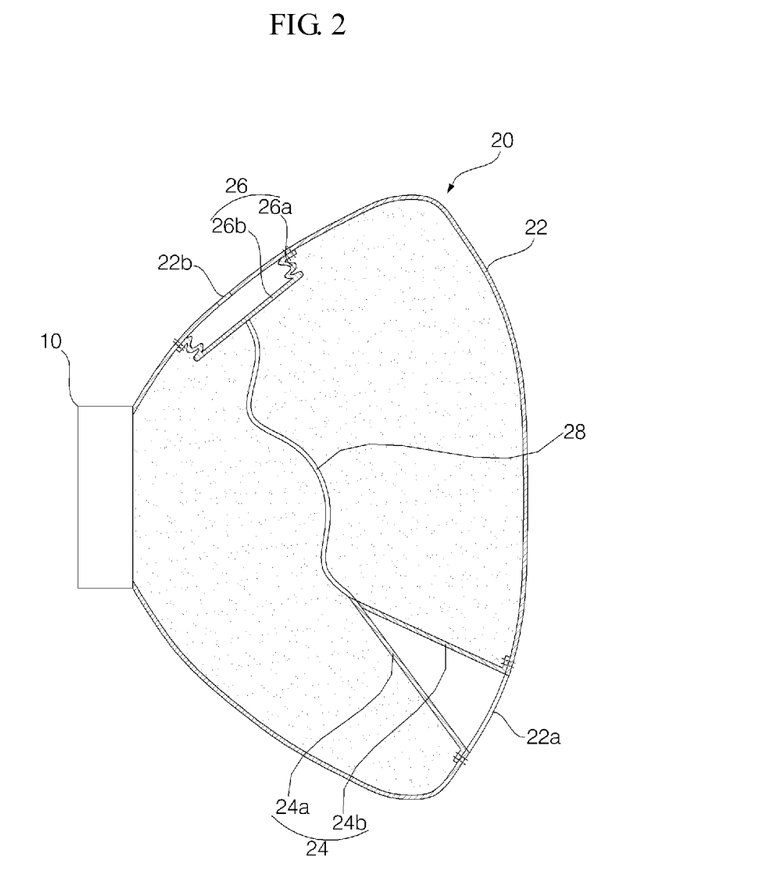
FIG. 2 is a cross-sectional view of FIG. 1.
Figure 3:
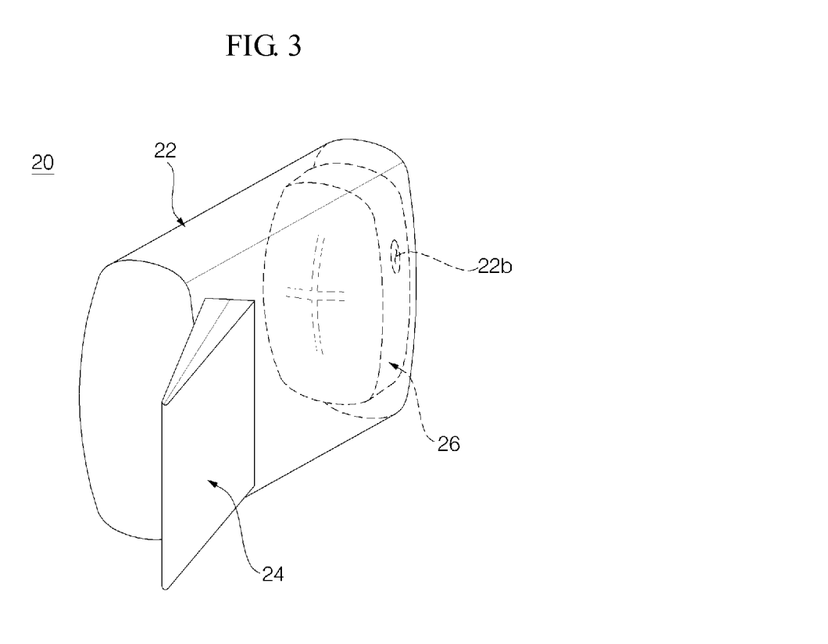
FIG. 3 is a view illustrating an operational state of FIG. 1.
Figure 4:
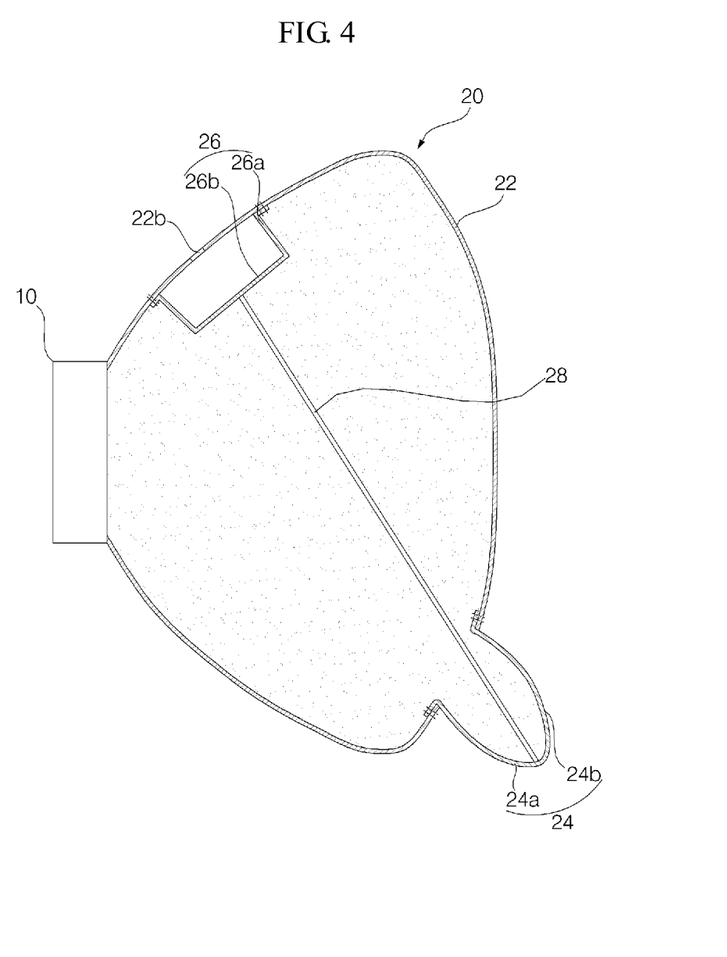
FIG. 4 is a cross-sectional view of FIG. 3.

FIG. 1 is a perspective view illustrating an airbag apparatus according to a first exemplary embodiment of the present invention, FIG. 2 is a cross-sectional view of FIG. 1, FIG. 3 is a view illustrating an operational state of FIG. 1, and FIG. 4 is a cross-sectional view of FIG. 3.

Referring to FIGS. 1 to 4, an airbag apparatus according to a first exemplary embodiment of the present invention includes an inflator 10 which generates gas, and an airbag 20 which is coupled to the inflator 10, and the air bag 20 is inflated and deployed when gas generated by the inflator 10 flows into the airbag 20, and protects a passenger seated in a front passenger seat.

The inflator 10 is coupled to a rear surface of the airbag 20. The inflator 10 is filled therein with a gas generating medium. The inflator 10 may generate gas by explosion of the gas generating medium at the time of a vehicle accident. The inflator 10 may be coupled to the airbag 20 in a state in which a head portion of the inflator 10, which discharges gas, is inserted into the airbag 20 so as to supply gas to the interior of the airbag 20.

The airbag 20 includes a main cushion 22 which has a rear surface to which the inflator 10 is coupled, a sub-cushion 24 which is coupled to the main cushion 22, and a hidden cushion 26 which is coupled to the main cushion 22.

The main cushion 22 is inflated when gas generated by the inflator 10 flows into the main cushion 22, and deployed toward the passenger. When the main cushion 22 is deployed, the passenger is protected by coming into contact with a front surface of the main cushion 22.

The sub-cushion 24 is coupled to the front surface of the main cushion 22 and disposed inside of the main cushion 22. The sub-cushion 24 may be disposed in a folded state in the main cushion 22. The sub-cushion 24 may be deployed toward the outside of the main cushion 22 while being unfolded by gas flowing into the main cushion 22.

As illustrated in FIGS. 3 and 4, when the main cushion 22 is fully inflated, the sub-cushion 24 protrudes further outward from the main cushion 22.

At the time of an oblique collision of the vehicle, the passenger in contact with the front surface of the main cushion 22 receives force by which the passenger slides toward a lateral side of the main cushion 22. Here, an "oblique collision" means a situation in which a portion between a front side and a lateral side of the vehicle obliquely collides with an object.

The sub-cushion 24 is coupled to the front surface of the main cushion 22 eccentrically toward one side, and as a result, when the main cushion 22 is fully inflated, the sub-cushion 24 protrudes to one side of the front surface of the main cushion 22. Therefore, at the time of an oblique collision of the vehicle, the sub-cushion 24 restricts the passenger who begins to slide toward the lateral side of the main cushion 22.

The sub-cushion 24 is inflated while consuming gas in the main cushion 22, thereby reducing deployment pressure of the main cushion 22. Therefore, it is not necessary for the sub-cushion 24 to be necessarily coupled to the front surface of the main cushion 22 in order to adjust the deployment pressure of the main cushion 22. For example, one or more sub-cushions 24 may be provided so that the sub-cushion 24 may be coupled to at least one of an upper surface, a lower surface, a lateral surface, and a rear surface of the main cushion 22. However, when the sub-cushion 24 is coupled to the front surface of the main cushion 22 eccentrically toward one side, there is an effect in that the sub-cushion 24 may restrict the passenger who begins to slide toward the lateral side of the main cushion 22 at the time of an oblique collision of the vehicle, and as a result, it is preferable that the sub-cushion 24 is coupled to the front surface of the main cushion 22 eccentrically toward one side.

A deployment hole 22a through which the sub-cushion 24 is deployed while protruding to the outside of the main cushion 22 is formed in the front surface of the main cushion 22. One side of the sub-cushion 24 is opened to be in communication with the deployment hole 22a, and the sub-cushion 24 may be coupled to an inner surface of the main cushion 22 while the opened one side of the sub-cushion 24 covers the deployment hole 22a.

The sub-cushion 24 may be manufactured using two flexible panels. That is, the sub-cushion 24 may include a first panel 24a, and a second panel 24b which is coupled to the first panel 24a.

The sub-cushion 24 is opened because one end of the first panel 24a and one end of the second panel 24b are not coupled to each other, and the sub-cushion 24 is completely manufactured by sewing together the circumferences of the remaining parts. The sub-cushion 24, which has been completely manufactured as described above, is disposed so that the opened one side faces the deployment hole 22a, and then may be sewed on and coupled to the inner surface of the main cushion 22. That is, one end of the first panel 24a is coupled to the main cushion 22. Further, one end of the second panel 24b is coupled to the main cushion 22, and the circumference of the remaining part of the second panel 24b is sewed on the circumference of the first panel 24a, such that the second panel 24b is coupled to the first panel 24a. A tether 28 is coupled to the other end of the first panel 24a and the other end of the second panel 24b.

The hidden cushion 26 is coupled to the lateral surface of the main cushion 22 and disposed in the main cushion 22. The hidden cushion 26 is coupled to the tether 28. That is, the tether 28 is coupled to the sub-cushion 24 and the hidden cushion 26, and when the sub-cushion 24 is tightened by deployment force, the sub-cushion 24 pulls the hidden cushion 26 by the tether 28 so that the hidden cushion 26 is deployed.

The tether 28 may be in a loosened state before the sub-cushion 24 protrudes to the outside of the main cushion 22, and the tether 28 may be pulled by the sub-cushion 24 and tightened when the sub-cushion 24 protrudes to the outside of the main cushion 22.

In a case in which a single tether 28 is provided, one end of the tether 28 may be coupled to the sub-cushion 24, and the other end of the tether 28 may be coupled to the hidden cushion 26. In addition, in a case in which a single longer tether 28 is provided, the center of the tether 28 may be coupled to one of the sub-cushion 24 and the hidden cushion 26, and both ends of the tether 28 may be coupled to the other. In addition, a plurality of tethers 28 may be provided.

The hidden cushion 26 is in a folded state when the hidden cushion 26 is not pulled by the tether 28, and may be unfolded and deployed when the hidden cushion 26 is pulled by the tether 28. The hidden cushion 26 is pulled by the tether 28 and then deployed, thereby reducing a volume in the main cushion 22. Therefore, even though gas in the main cushion 22 is consumed while the sub-cushion 24 is inflated, the hidden cushion 26 reduces a volume in the main cushion 22, and as a result, the main cushion 22 may maintain the deployment pressure.

A communicating hole 22b, which is in communication with the outside, is formed in the main cushion 22 at a position corresponding to the hidden cushion 26. One side of the hidden cushion 26 is opened to be in communication with the communicating hole 22b, and the hidden cushion 26 is coupled to the main cushion 22 while the opened one side of the hidden cushion 26 covers the communicating hole 22b. When the hidden cushion 26 is pulled by the tether 28 and then deployed, outside air flows into the hidden cushion 26 through the communicating hole 22b, such that the hidden cushion 26 may be easily deployed.

In order for the hidden cushion 26 to be smoothly deployed by deployment force of the sub-cushion 24, a volume of the sub-cushion 24 may exceed 80% of a volume of the hidden cushion 26.

The hidden cushion 26 may include a base portion 26a, and a tether coupling portion 26b. The base portion 26a protrudes from the main cushion 22, and has one side edge that is coupled to the main cushion 22. The tether coupling portion 26b is disposed at the other side of the base portion 26a and coupled to the tether 28.

In a case in which the base portion 26a and the tether coupling portion 26b are integrally formed, the tether coupling portion 26b defines the other surface of the base portion 26a.

In a case in which the base portion 26a and the tether coupling portion 26b are separately provided, the base portion 26a is formed in an annular shape having both ends opened, and one opened side edge of the base portion 26a is coupled to the main cushion 22. In addition, the tether coupling portion 26b shields the other opened side of the base portion 26a, and is coupled to the other side edge of the base portion 26a. The tether 28 is coupled to the center of the base portion 26b so as to allow the hidden cushion 26 to be deployed without being biased to one side.

An operation of the airbag apparatus according to the first exemplary embodiment of the present invention, which is configured as described above, will be described below.

First, at the time of a vehicle accident, the inflator 10 generates gas and supplies the generated gas into the main cushion 22.

Thereafter, the main cushion 22 is deployed toward the passenger while being inflated by gas supplied from the inflator 10. In addition, the sub-cushion 24 protrudes to the outside of the main cushion 22 through the deployment hole 22a formed in the main cushion 22 while being inflated by gas in the main cushion 22, and is deployed while protruding further from the main cushion 22.

As the sub-cushion 24 is deployed, the tether 28 coupled to the sub-cushion 24 is tightened and pulls the hidden cushion 26 so that the hidden cushion 26 is deployed into the main cushion 22. Therefore, even though gas in the main cushion 22 is consumed while the sub-cushion 24 is inflated, the hidden cushion 26 reduces a volume in the main cushion 22, and as a result, the main cushion 22 may maintain appropriate deployment pressure.

Figure 5:
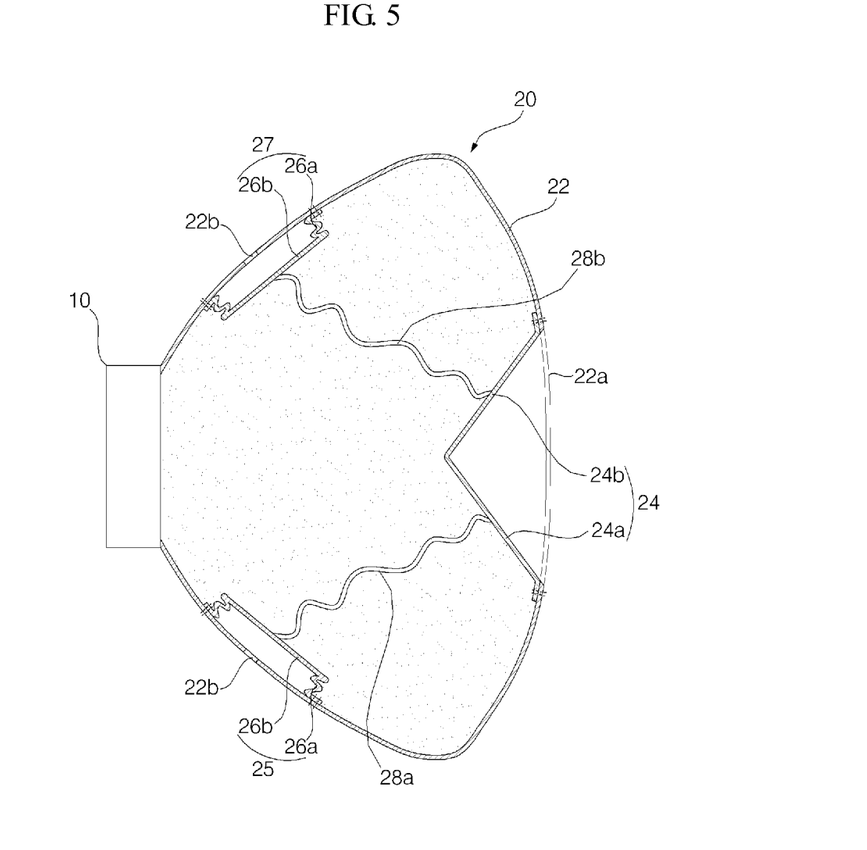
FIG. 5 is a cross-sectional view illustrating an airbag apparatus according to a second exemplary embodiment of the present invention.
Figure 6:
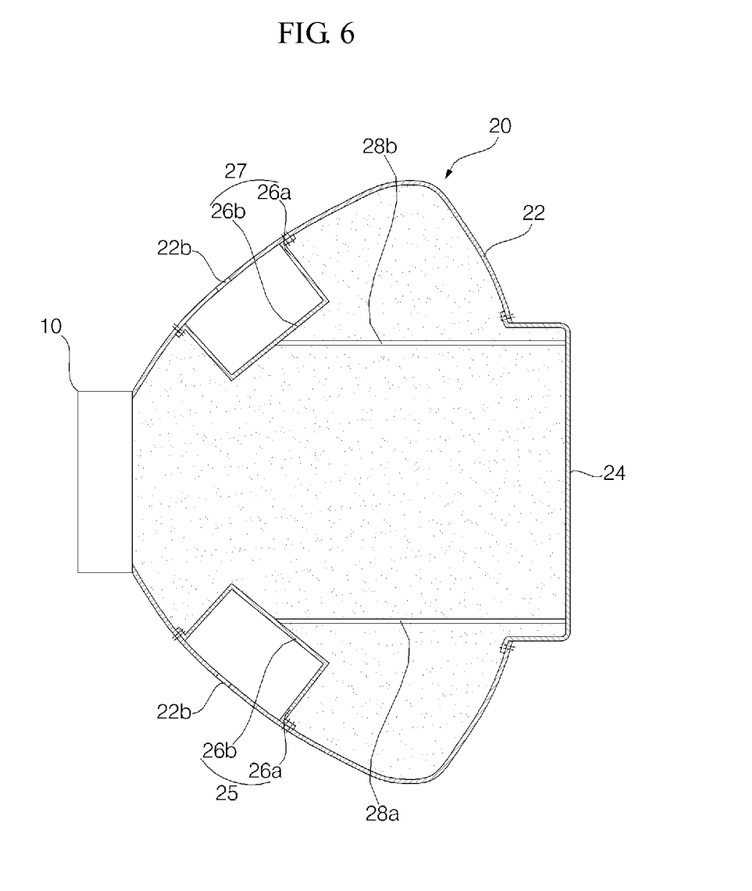
FIG. 6 is a view illustrating an operational state of FIG. 5.

FIG. 5 is a cross-sectional view illustrating an airbag apparatus according to a second exemplary embodiment of the present invention, and FIG. 6 is a view illustrating an operational state of FIG. 5. Hereinafter, like reference numerals refer to constituent elements identical to those of the aforementioned first exemplary embodiment, a description thereof will be omitted, and only differences between the exemplary embodiments will be described.

Referring to FIGS. 5 and 6, it can be seen that the airbag apparatus according to the second exemplary embodiment of the present invention differs from the airbag apparatus according to the first exemplary embodiment.

That is, in the first exemplary embodiment, the single hidden cushion 26 is provided, but in the second exemplary embodiment, two hidden cushions 25 and 27 are provided, and the hidden cushions 25 and 27 include a first hidden cushion 25 which is coupled to one surface of the main cushion 22, and a second hidden cushion 27 which is coupled to the other surface of the main cushion 22.

Tethers 28a and 28b include a first tether 28a which is coupled to the sub-cushion 24 and the first hidden cushion 25, and a second tether 28b which is coupled to the sub-cushion 24 and the second hidden cushion 27. One end of the first tether 28a is coupled to the center of a first panel 24a of the sub-cushion 24, and the other end of the first tether 28a is coupled to the center of a tether coupling portion 26b of the first hidden cushion 25. One end of the second tether 28b is coupled to the center of a second panel 24b of the sub-cushion 24, and the other end of the second tether 28b is coupled to the center of a tether coupling portion 26b of the second hidden cushion 27.

The sub-cushion 24 is coupled to the center of the front surface of the main cushion 22. Therefore, the sub-cushion 24 protrudes toward the passenger by gas in the main cushion 22. In this case, at the time of a vehicle accident, the passenger is protected by coming into contact with the sub-cushion 24. As such, in a case in which the sub-cushion 24 is coupled to the center of the front surface of the main cushion 22, it is possible to adjust a point of time at which the passenger comes into contact with the airbag 20 at the time of a vehicle accident.

According to the airbag apparatus according to the present invention as described above, the tethers 28, 28a, and 28b are tightened by deployment force of the sub-cushion 24, and pull the hidden cushions 26, 25, and 27 disposed in the main cushion 22 so that the hidden cushions 26, 25, and 27 are deployed, such that a volume in the main cushion 22 is reduced by the hidden cushions 26, 25, and 27, thereby maintaining deployment pressure of the main cushion 22.

According to the airbag apparatus of the exemplary embodiments, a tether is tightened by deployment force of a sub-cushion, and pulls a hidden cushion disposed in a main cushion so that the hidden cushion is deployed. A volume in the main cushion is reduced by the hidden cushion, thereby maintaining deployment pressure of the main cushion.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An airbag apparatus comprising:
   a main cushion configured to be inflated when gas flows into the main cushion, and be deployed toward a passenger;
   a sub-cushion coupled to the main cushion, disposed in the main cushion, and configured to be deployed to the outside of the main cushion by gas in the main cushion;
   a hidden cushion coupled to the main cushion, and disposed in the main cushion; and
   a tether coupled to the sub-cushion and the hidden cushion, and configured to pull the hidden cushion by deployment force of the sub-cushion so that the hidden cushion is deployed.

2. The airbag apparatus of claim 1, wherein the sub-cushion is coupled to a front surface of the main cushion.

3. The airbag apparatus of claim 1, wherein the sub-cushion is coupled to a front surface of the main cushion eccentrically toward one side.

4. The airbag apparatus of claim 1, wherein the hidden cushion is coupled to a lateral surface of the main cushion.

5. The airbag apparatus of claim 1, further comprising a communicating hole, which is in communication with the outside, formed in the main cushion, wherein:
   one side of the hidden cushion is open to be in communication with the communicating hole; and
   the hidden cushion is coupled to the main cushion while the open one side of the hidden cushion covers the communicating hole.

6. The airbag apparatus of claim 1, wherein the hidden cushion comprises:
   a base portion that protrudes from the main cushion, and has one side edge that is coupled to the main cushion; and
   a tether coupling portion disposed at the other side of the base portion, and coupled to the tether.

7. The airbag apparatus of claim 1, further comprising a deployment hole, through which the sub-cushion is deployed to the outside of the main cushion, formed in the main cushion, wherein:
   one side of the sub-cushion is open to be in communication with the deployment hole; and
   the sub-cushion is coupled to the main cushion while the open one side of the sub-cushion covers the deployment hole.

8. The airbag apparatus of claim 1, wherein the sub-cushion comprises:
   a first panel having one end that is coupled to the main cushion; and
   a second panel having one end that is coupled to the main cushion,
   wherein the circumferences of the remaining parts of the first panel and the second panel are coupled to each other.

9. The airbag apparatus of claim 8, wherein the tether is coupled to the other end of the first panel and the other end of the second panel.

10. The airbag apparatus of claim 1, wherein the hidden cushion comprises:
    a first hidden cushion coupled to one side of the main cushion; and
    a second hidden cushion coupled to the other side of the main cushion.

11. The airbag apparatus of claim 10, wherein the tether comprises:
    a first tether coupled to the sub-cushion and the first hidden cushion; and
    a second tether coupled to the sub-cushion and the second hidden cushion.

12. The airbag apparatus of claim 1, wherein the sub-cushion is disposed at a center of a front surface of the main cushion.

* * * * *